2,947,758
3-(ω-HYDRAZINO)ALKYLINDOLES

Richard A. Robinson, Evanston, Ill., assignor to G. D. Searle & Co., Chicago, Ill., a corporation of Delaware No Drawing. Filed Apr. 28, 1959, Ser. No. 809,351

4 Claims. (Cl. 260—319)

The present invention relates to novel organic bases which are characterized by an indole ring structure and contain also a hydrazino group. These compounds are 3-(ω-hydrazino)alkylindoles and can be represented by the structural formula

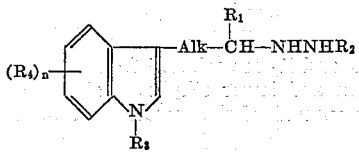

wherein Alk is an alkylene radical containing fewer than 6 carbon atoms; $R_1$ is hydrogen or a lower alkyl radical; $R_2$ is hydrogen or a hydrocarbon radical containing fewer than 8 carbon atoms and optionally substituted by an hydroxyl group; $R_3$ is selected from the group consisting of hydrogen and benzyl and lower alkyl radicals; $R_4$ is selected from the group consisting of halogen and hydroxyl, lower alkyl, lower alkoxy, and lower alkanoyl radicals; and $n$ is 0 or a positive integer less than 4.

Lower alkyl radicals as defined herein are exemplified by methyl, ethyl, propyl, butyl, pentyl, hexyl, heptyl, octyl, and branched-chain isomers thereof. Lower alkoxy groups are defined as those possessing the structure —O-lower alkyl while the term "lower alkanoyl" is designated by the structure.

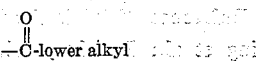

The alkylene radicals represented by Alk are exemplified by

—CH$_2$— (methylene)
—CH$_2$CH$_2$— (ethylene)
—CH$_2$CH$_2$CH$_2$— (trimethylene)
—CH$_2$CH$_2$CH$_2$CH$_2$— (tetramethylene)

$\quad\quad$ CH$_3$
$\quad\quad$ |
—CH$_2$CH— (1,2-propylene)

$\quad\quad$ CH$_3$
$\quad\quad$ |
—CH$_2$CHCH$_2$— (2-methyl-1,3-propylene)

Examples of hydrocarbon radicals containing fewer than 8 carbon atoms and optionally substituted by an hydroxyl group, as represented by $R_2$, are methyl, ethyl, butyl, heptyl, cyclopentyl, cyclohexyl, 2-hydroxyethyl, 3-hydroxybutyl, phenyl, benzyl, tolyl, hydroxyphenyl, hydroxybenzyl, and trihydroxyphenyl.

Preferred embodiments of this invention are the 3-hydrazinoalkylindoles represented by the structural formula

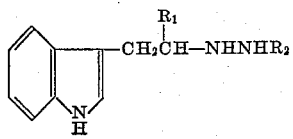

wherein $R_1$ and $R_2$ are selected from the group consisting of hydrogen and lower alkyl radicals. A process for the manufacture of these compounds involves the reaction of an indolemethyl carbonyl compound of the structural formula

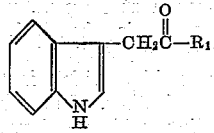

wherein $R_1$ is hydrogen or a lower alkyl group, with a hydrazine of the structural formula

wherein $R_2$ is hydrogen or a lower alkyl group, in a hydrogen atmosphere in the presence of a catalytic quantity of platinum oxide. A suitable starting material for the preparation of compounds in which $R_1$ is hydrogen, is 3-formylmethylindole. As a specific example, a mixture of the latter aldehyde, hydrazine, acetic acid, and platinum oxide is reacted in a hydrogen atmosphere to afford 3-(2-hydrazinoethyl)indole. On the other hand, the aforementioned compounds in which $R_1$ is a lower alkyl radical are preferably prepared from a 3-(2-oxoalkyl)indole in which the alkyl radical contains 3–10 carbon atoms. For example, 3-(2-oxopropyl)indole and isopropylhydrazine are reacted in a hydrogen atmosphere in the presence of acetic acid and platinum oxide, resulting in 3-(2-isopropylhydrazino-2-methyl)ethylindole. It is readily apparent that the compounds in which $R_1$ and $R_2$ are lower alkyl groups result from the reaction of 3-(2-oxoalkyl)indoles with alkylhydrazines, both of which are defined supra.

The compounds of the present invention are useful as result of their valuable pharmacological properties. They are, for example, central nervous system stimulants. As is known to those skilled in the art, substances of this type are effective in alleviating the symptoms associated with depressive states.

The invention will appear more fully from the examples which follow. These examples are set forth by way of illustration only and it will be understood that the invention is not to be construed as limited in spirit or in scope by the details contained therein as many modifications in materials and methods will be apparent in this disclosure to those skilled in the art. In these examples temperatures are given in degrees centigrade (° C.). Pressures are designated as pounds per square inch (p.s.i.). Quantities of materials are expressed in parts by weight unless otherwise noted.

EXAMPLE 1

3-(2-hydrazinoethyl)indole

A mixture of 16 parts of 3-formylmethylindole, 6 parts of hydrazine hydrate, 7 parts of acetic acid, 0.25 part of platinum oxide, and 200 parts of methanol is shaken in a hydrogen atmosphere at 15 p.s.i. until one molecular equivalent of hydrogen is absorbed. The catalyst is removed by filtration and the filtrate concentrated to dryness in vacuo. The residue is treated with dilute sodium hydroxide and ether, and the ether extract dried over anhydrous sodium sulfate. Evaporation of the ether in vacuo results in 3-(2-hydrazinoethyl)-indole.

By the addition of one molecular equivalent of oxalic acid to the aforementioned ether solution of the product, the oxalic acid salt is obtained. The precipitate is collected by filtration and extracted with water. The aqueous extract is evaporated to dryness and the residue washed with isopropanol to afford 3-(2-hydrazinoethyl)-indole oxalate.

By substituting n-butylhydrazine and otherwise proceeding according to the herein described processes, 3-[2-(n-butylhydrazino)ethyl]indole is obtained.

EXAMPLE 2

3-(2-hydrazino-2-methyl)ethylindole

A mixture of 34 parts of 3-(2-oxopropyl)indole, 12 parts of hydrazine hydrate, 14 parts of acetic acid, 0.5 part of platinum oxide, and 300 parts of methanol is shaken under hydrogen at 15 p.s.i. until one molecular equivalent of hydrogen is absorbed. Removal of the catalyst by filtration and distillation of the solvent in vacuo results in a residue which is treated with dilute sodium hydroxide and ether. The ether extract is dried over anhydrous sodium sulfate and evaporated to dryness to yield 3-(2-hydrazino-2-methyl)ethylindole.

The aforementioned ether solution of the instant base is reacted with one molecular equivalent of oxalic acid to precipitate the resulting salt. This oxalate is collected by filtration and extracted into water. Evaporation of the aqueous extract to dryness in vacuo followed by washing of the residue with isopropanol affords pure 3-(2-hydrazino-2-methyl)ethylindole oxalate, M.P. about 181°.

By substituting isopropylhydrazine and otherwise proceeding according to the herein described processes, 3-(2-isopropylhydrazino-2-methyl)ethylindole is obtained.

EXAMPLE 3

3-(2-oxo-n-pentyl)indole

To a solution of 114 parts of methyl magnesium bromide in 600 parts of ether is added at 0–5° over a period of about one hour, a solution of 96 parts of indole in 180 parts of ether. Stirring at 0–5° is continued for about 45 minutes. A solution of 85 parts of 1,2-pentylene oxide in 400 parts of benzene is added dropwise and the resulting mixture allowed to react at 0° with stirring for two hours, then at room temperature for two hours. The solvents are distilled over a period of about 5 hours on the steam bath and the residue treated successively with cracked ice and solid carbon dioxide. Extraction of this mixture with ether followed by evaporation of the ether affords 3-(2-hydroxy-n-pentyl)-indole which distills at about 162°/0.05 mm.

A mixture of 100 parts of 3-(2-hydroxy-n-pentyl)-indole, 800 parts of cyclohexanone, 74 parts of aluminum isopropoxide, and 2500 parts of toluene is heated at reflux for about 35 minutes. This mixture is cooled, washed with dilute mineral acid, and concentrated in vacuo. Heating of the residue under high vacuum results in distillation of the product at about 130–150°/0.05 mm. Recrystallization from isopropanol affords pure 3-(2-oxo-n-pentyl)indole.

EXAMPLE 4

3-(2-hydrazino-2-n-propyl)ethylindole

By substituting 3-(2-oxo-n-pentyl)indole for 3-(2-oxopropyl)indole in the procedure described in Example 2, 3-(2-hydrazino-2-n-propyl)ethylindole is obtained.

EXAMPLE 5

3-(2-n-hexylhydrazino-2-n-propyl)ethylindole

By substituting 3-(2-oxo-n-pentyl)indole and n-hexylhydrazine for 3-(2-oxopropyl)indole and hydrazine hydrate, respectively, in the process of Example 2; 3-(2-n-hexylhydrazino-2-n-propyl)ethylindole is obtained.

What is claimed is:

1. A compound of the structural formula

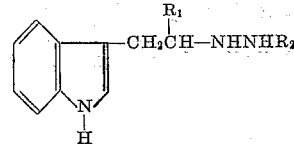

wherein $R_1$ and $R_2$ are selected from the group consisting of hydrogen and lower alkyl radicals.

2. A compound of the structural formula

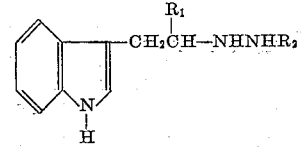

wherein $R_1$ and $R_2$ are lower alkyl radicals.

3. A compound of the structural formula

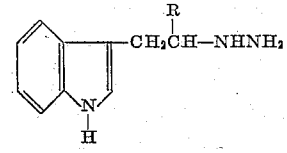

wherein R is a lower alkyl radical.

4. 3-(2-hydrazino-2-methyl)ethylindole.

References Cited in the file of this patent

Thesing et al.: Berichte, vol. 89 (1956), pp. 1195–1203.